United States Patent [19]
Ilon

[11] 3,746,112
[45] July 17, 1973

[54] DIRECTIONALLY STABLE SELF PROPELLED VEHICLE

[76] Inventor: Bengt Erland Ilon, Stromkarlsvagen 43, S-161 38 Bromma, Sweden

[22] Filed: Dec. 2, 1971

[21] Appl. No.: 204,129

[30] Foreign Application Priority Data
Dec. 14, 1970 Sweden.............................. 16864/70

[52] U.S. Cl..................... 180/6.2, 115/1 R, 115/19, 180/7 A, 301/5 PR
[51] Int. Cl........................................... B62d 11/00
[58] Field of Search..................... 180/6.2, 3 A, 7 A, 180/7 R; 115/1 R, 19; 305/52; 301/5 PR

[56] References Cited
UNITED STATES PATENTS

| | | | |
|---|---|---|---|
| 3,396,690 | 8/1968 | Tsunazawa........................ | 180/6.2 X |
| 3,591,241 | 7/1971 | Allen.................................... | 180/7 R |
| 669,210 | 3/1901 | Burch ................................. | 180/7 A |
| 1,672,613 | 6/1928 | Howell................................. | 115/19 |
| 2,154,191 | 4/1939 | Welsh .................................. | 180/7 A |
| 2,495,643 | 1/1950 | Pidgeon ............................. | 115/19 X |
| 3,381,650 | 5/1968 | Itoh et al. .......................... | 115/19 X |
| 3,420,326 | 1/1969 | Kusmer.............................. | 180/6.2 |

FOREIGN PATENTS OR APPLICATIONS
1,153,266  8/1963  Germany ............................ 180/7 A

*Primary Examiner*—Benjamin Hersh
*Assistant Examiner*—John A. Pekar
*Attorney*—John J. Dennemeyer

[57] ABSTRACT

A directionally stable self propelled vehicle movable in any desired direction and equipped with at least two front and two rear rotatable driving gears having ground contact elements mounted obliquely to the axes of rotation of the driving gears. The ground contact elements being mounted so that the ground contact lines for the front set of driving gears intersect in the backward direction and that the ground contact lines for the rear set of driving gears intersect in the forward direction.

5 Claims, 17 Drawing Figures

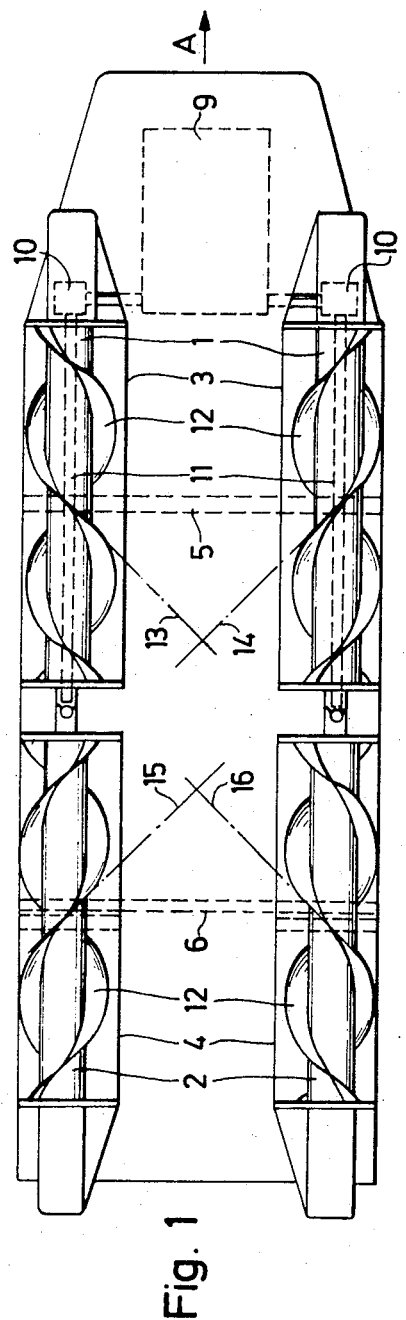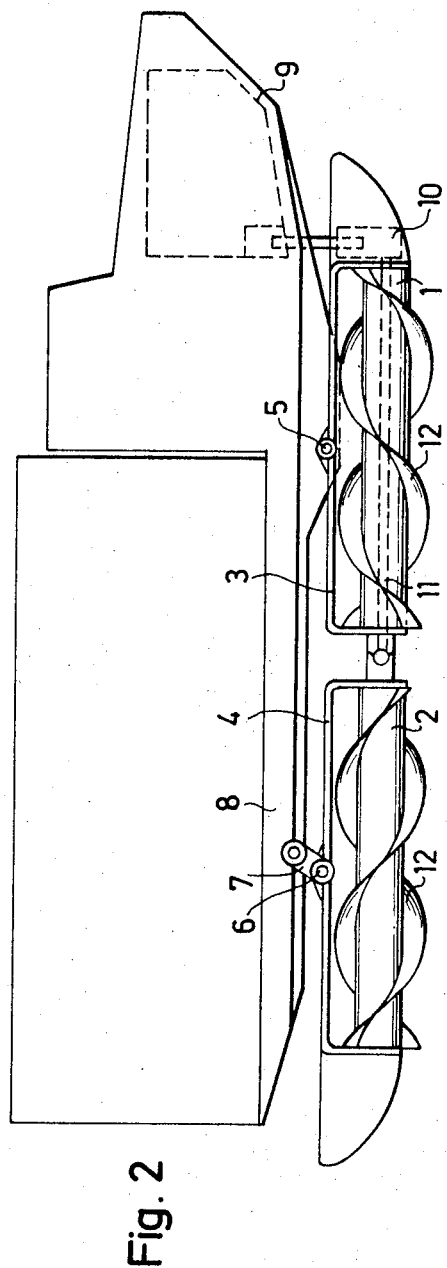

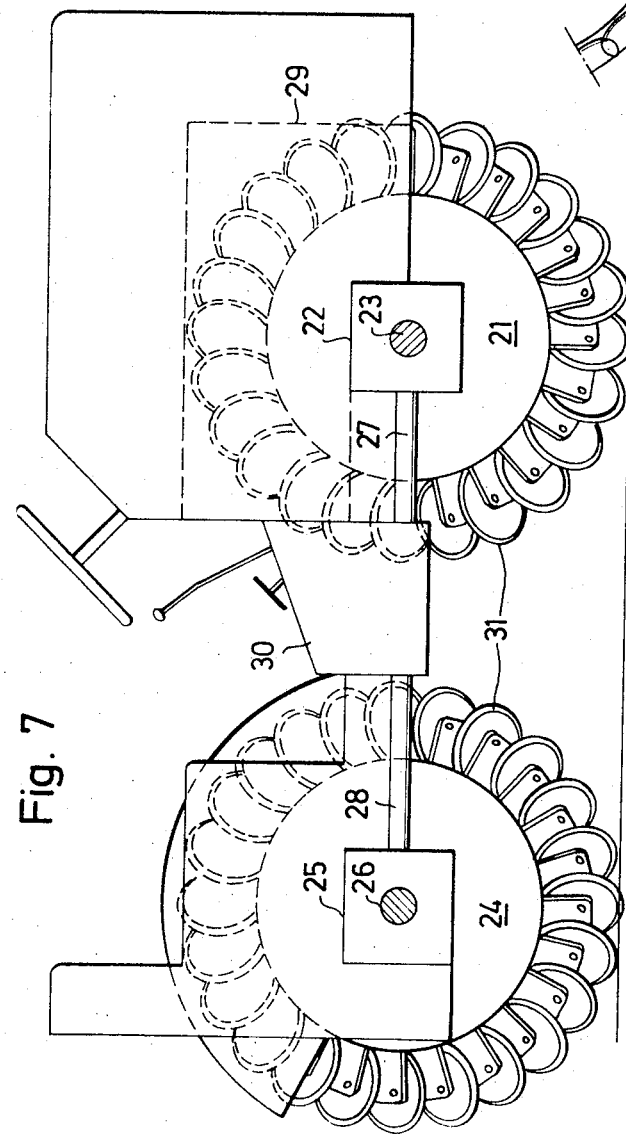
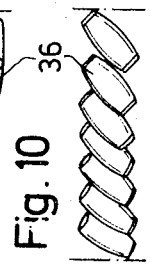
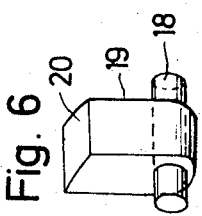
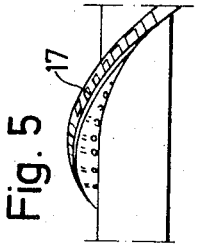
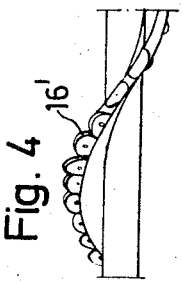
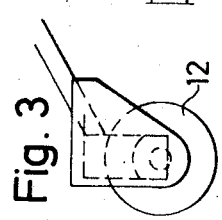

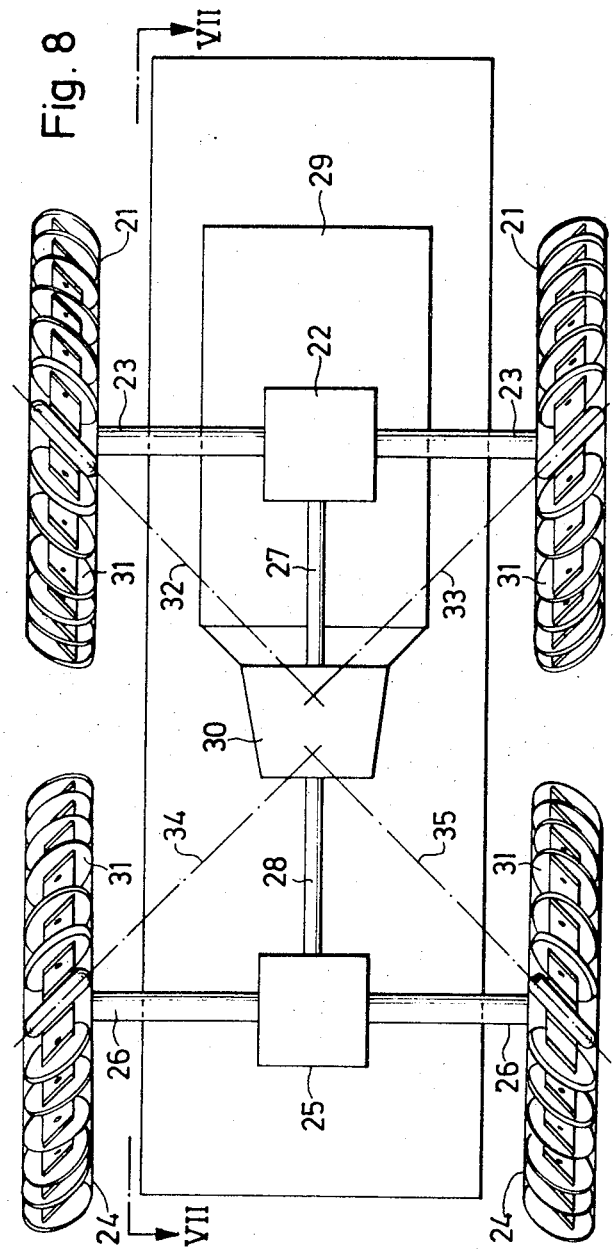
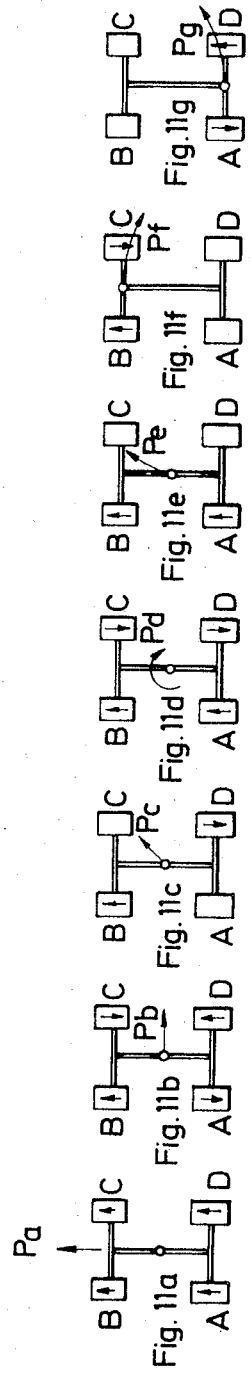

DIRECTIONALLY STABLE SELF PROPELLED VEHICLE

The present invention relates to a directionally stable self propelled vehicle and more precisely a directionally stable self propelled vehicle capable of movement in any desired direction over land or other surfaces and fitted with at least two front and two rear rotatable assemblies or sets of driving gears positioned about the longitudinal vertical section through the vehicle and with these working in conjunction with gripping gear or ground contact elements mounted obliquely to the axes of rotation of the driving gear. Such vehicles could be used under a wide range of conditions, e.g. as dry land vehicles, climbing vehicles, amphibians and combined snow, ice and water vehicles.

Vehicles of this kind have previously been suggested for use, for example, over snow and ice covered ground. In one form of this type of vehicle the driving gear consists of coil shaped drums. These are fitted externally with screwthread like gripping gear or ground contact elements and are arranged in pairs on axles parallel to the longitudinal axis of the vehicle with each pair driven by a common motor. The axles are arranged to rotate in opposite directions and propulsion of the vehicle is by means of the gripping gear which, on the drums of one axle, is threaded in one direction and which, on the other drums, are threaded in the other direction. For steering, the vehicle is fitted with a steering wheel which, through gearing, operates movable steering runner assemblies in the front of the front of the vehicle. In spite of this steering arrangement the vehicle is not completely directionally stable. If friction between the drums and the surface varies, so that it is not equal for all drums, the rear end of the vehicle swings sideways in one direction or the other which, under some circumstances, can involve considerable risk. Vehicles of this type also suffer from the disadvantage that they are rather long and difficult to maneuver in that the steering is by means of runners. The turning radius of the vehicle is thus relatively great which, especially in difficult terrain, constitutes a further serious drawback. This steering arrangement is thus a limiting factor both for this reason and for many others worthy of consideration in view of the possible range of uses for the vehicle.

By means of the teaching of this invention, the above drawbacks are completely avoided.

It is an object of the invention to provide a vehicle which is completely stable directionally and which is easily maneuverable as well as freely capable of movement in any desired direction which, in use, enables the turning circle to be as small as necessary and even, if required, to be virtually zero.

In accordance with the invention the driving gears are individually rotatable and are obliquely mounted by the ground contact elements in such a way that the ground contact lines for the front sets of driving gear intersect in the backward direction and that the ground contact lines for the rear sets of driving gear intersect in the forward direction.

The attached sketches show schematically a number of details of the invention. Of these:

FIG. 1 is a horizontal projection of a vehicle incorporating the invention, seen from below;

FIG. 2 is a side view of the vehicle of FIG. 1;

FIG. 3 is an end view of one of the vehicle's sets of driving gear;

FIG. 4 shows a detailed view of one variant of such driving gear;

FIG. 5 shows a detailed view of another variant of the driving gear;

FIG. 6 shows a detail of the variant of FIG. 5 to a larger scale;

FIG. 7 is a longitudinal section of another vehicle incorporating the invention;

FIG. 8 is a horizontal section of the vehicle of FIG. 7 seen from below;

FIG. 9 is a detailed view of one set of driving gear of the vehicle of FIG. 8;

FIG. 10 is a horizontal projection of the driving gear of FIG. 9;

FIGS. 11a – 11g show a number of possible movement combinations for the vehicle of FIGS. 7 and 8.

The vehicle to the design shown in FIGS. 1 and 2, which is seen primarily as being suitable for snow and ice covered ground, is fitted with driving gear in the form of two front and two rear longitudinal cylindrical rollers, 1 and 2 respectively. The rollers which, with their axles, are oriented parallel to the longitudinal axis of the vehicle's vertical mid-section and are arranged in pairs about this section, being independently rotatable within the yoke shaped supports 3, 4 which, by means of transverse axles 5, 6 and links 7, act as suspension for the vehicle body 8. This also carries a driving motor 9 from which the driving torque, by means of hydraulic couplings 10 of known design, is transmitted partly directly to the forward driving gear 1 and partly indirectly by the central through axle 11 to the rear driving gear 2. Each of the sets of driving gear is fitted with oblique screw thread shaped strips 12 which form groups of driving or ground contact elements with a pitch angle such that the lines of contact with the ground 13, 14 for the forward driving gear converge towards the rear while the lines of contact with the ground 15, 16 for the rear driving gear converge in the forward direction. This arrangement of the directions of the ground contact lines is of decisive importance to the directional stability of the vehicle. A change in the course of the vehicle involves all the ground contact elements being able to turn about a common centre of rotation. If it is assumed, for the sake of simplicity, that just one ground contact element on each set of driving gear is in contact with the ground, it can be seen that the centre of rotation for both sets of front driving gear, represented by the point of intersection of the normals to the elements in contact with the ground, cannot coincide with the corresponding centre of rotation for the contact elements of the two sets of rear driving gear since the directions of the contact lines are such that those 13, 14 for the front driving gear converge to the rear while those 15, 16 for the rear driving gear converge in the forward direction. Since the direction lines are perpendicular to th normals it is clear that these points of intersection cannot coincide. Thus, if the friction between the driving gear and the ground should vary as mentioned above, the vehicle will maintain its course. This situation does not however hinder the maneuvering of the vehicle in other directions. Deliberate changes in the direction of movement of the vehicle may be achieved by regulating the speed and/or the direction of rotation of the individual sets of driving gear, and the vehicle may thus be moved in any desired direction as described below.

Forward movement in a straight line, i.e. in the direction of the arrow A in FIG. 1, is obtained if all sets of driving gear are driven by the motor 9 through the hydraulic couplings 10 at the same speed, provided of course that the pitch and diameter of the ground contact elements are equal for all sets of driving gear, and if the direction of rotation of the sets of driving gear, taken cyclically, are alternate, which implies that any two adjacent sets of driving gear rotate in opposite directions. Backward movement in a straight line is obtained in a similar way, the direction of rotation of all sets of driving gear being reversed. Sideways movement in a straight line, i.e at right angles to the arrow A, is obtained by rotating all driving gear in one and the same direction. It is obvious that by altering the speed of rotation of part of the driving gear with respect to that of the remainder, the vehicle can also be made to follow an arbitrarily straight or crooked path.

As will be seen from the above, the movement of the vehicle in the desired direction requires the sets of driving gear to be mounted separately and so arranged that they can be rotated independently in both speed and direction. It is thus also possible to rotate the vehicle about its own central vertical axis. This may be achieved by making both sets of forward driving gear 1 rotate in one and the same direction while both rear sets of driving gear 2 rotate in the opposite direction. The driving gear blades could, as shown in FIG. 4, be fitted with small wheels or rollers 16 mounted in the outer edge of the blade, assuring that their axes of rotation are at least approximately at right angles to the line of the blade. This would facilitate the use of the vehicle over rough ground, i.e. surfaces other than snow and ice. Alternatively, as shown in FIG. 5, the same end may be achieved by mounting rotating segments or similar elements 17 in the peripheral groove. By such means the friction between the driving gear and the ground can be reduced. Element 17 could, as shown in FIG. 6, be made in the form of swinging arm assemblies 19 mounted on individual axles 18 and having end surfaces 20 suitable for contact with the ground.

The vehicle of the design shown in FIGS. 7 and 8, envisaged for use on comparatively even surfaces, is equipped with two front driving wheels 21 arranged in a pair along the transverse axis of the vehicle and coaxial axles 23 lead from a forward gearbox 22 to the front driving wheels 21. Two rear driving wheels 24 are similarly arranged along the transverse axis of the vehicle, and coaxial axles 26 lead from a rear gearbox 25 to the wheels 24. Both gearboxes 22, 25, which are arranged so as to allow selection of the desired speed and/or direction of rotation of the driving wheels, are in turn, by means of their own longitudinal axles 27, 28, connected to the ordinary gearbox 30 associated with the driving motor 29 of the vehicle as shown in FIG. 7 which is a section along the line VII – VII in FIG. 8. Each of the driving wheels is equipped on its periphery with a number of rotatable sheaves or wheels 31 which are mounted obliquely so as to make an angle of approximately 45° with the plane of the wheel and so that the direction of the ground contact lines 32, 33 for the sheaves on the front driving wheels 21 converge to the rear while the ground contact lines 34, 35 for the sheaves on the rear driving wheels 24 converge in the forward direction. The driving wheels are also independently mounted and are capable of individual regulation with regard to speed and direction of rotation by means of the gearboxes 22, 25, 30 so that the vehicle can be made to move in a directionally stable manner both forwards and backwards as well as sideways and in intermediate directions as shown in FIGS. 11a – 11g. The vehicle shown in FIG. 7 can move in any desired direction.

For the vehicles depicted symbolically in FIGS. 11a – 11g, shown in horizontal projection from above, the four driving wheels are designated A, B, C, D and their directions of rotation are shown by means of arrows on each wheel. Thus in FIG. 11a all the driving wheels rotate in the same direction and the vehicle is made to move in the direction of the arrow Pa. This means that the sheaves round the periphery of the driving wheels are brought in sequence into contact with the ground without rotating about their own axes. It is clear that if the direction of the rotation of all the driving wheels is reversed the vehicle will move in the direction opposite to that of the errow Pa, i.e. backwards. For special purposes the direction of rotation of wheels A and D can be made opposite to that of wheels B and C, namely if it is required to produce a shortening or lengthening of the wheelbase. The arrangement must then be such that it permits a mutual displacement between wheels A and D on the one part and wheels B and C on the other. A change in the direction of rotation of wheels B and C in FIG. 11a should thus involve displacement of wheels A and D towards B and C, and a change in the direction of rotation of wheels A and D should involve a displacement of these wheels away from wheels D an C. Such an arrangement can be particularly useful in, for example, casualty transport applications. The track widths for the front and rear wheels can with advantage be made unequal so that a shortening of the wheelbase is facilitated and the wheelbase can thus be made as short as possible.

If the driving wheels A and C, as shown in FIG. 11b, rotate in one direction while wheels B and D rotate in the opposite direction, the vehicle moves sideways as shown by the arrow Pb and, on all wheels, the sheaves in contact with the ground will rotate about their own axes in such a way that the ground contact points move in paths parallel to the arrow Pb. In this case also it is clear that if the direction of rotation of all wheels is reversed, the vehicle moves in a direction opposite to that of the arrow Pb.

If the driving wheels B and D rotate in opposite directions while wheels A and C are held stationary, the vehicle moves diagonally in the direction of the arrow Pc as shown in FIG. 11c. On wheels A and C the sheaves in contact with the ground rotate about their own axes and their ground contact points move in paths parallel to the arrow Pc. This also applies to wheels B and D. In this case also, of course, if the direction of rotation of wheels B and D is reversed while wheels A and C are held stationary, the vehicle moves in a direction opposite to that of the arrow Pc. Similarly movement in the other diagonal directions may be achieved by movement of wheels A and C.

If, as shown in FIG. 11d, wheels A and B rotate in one and the same direction while wheels C and D rotate in the other direction, the vehicle will turn on the spot as indicated by the arrow Pd. In this case all the sheaves in contact with the ground will rotate about their own axes. If the direction of rotation of all wheels is reversed the vehicle will of course rotate in the direction opposite to that indicated by the arrow Pd.

If, as shown in FIG. 11e, wheels A and B rotate in one and the same direction while wheels C and D are held stationary or made to rotate in a similar direction but with a speed differing from that of wheels A and B, the vehicle will move along a curved path as shown by the arrow Pc and with a curvature depending on the difference in the speed of rotation of wheels A and B on the one part and wheels C and D on the other.

If, as shown in FIG. 11f, wheels B and C rotate in opposite directions while wheels A and D are held stationary, the vehicle moves in the direction of the arrow Pf, moving the front of the vehicle sideways, i.e. giving a rotation about the point of intersection of the normals to the sheaves forming the points of contact with the ground for wheels A and D. Similarly the vehicle moves in the direction of the arrow Pg as shown in FIG. 11g if wheels A and D rotate in opposite directions while wheels B and C are held stationary.

In the case of movement as shown in FIGS. 11e – 11g the sheaves in contact with the ground rotate about their own axes in one direction or another which means that the rolling resistance is relatively low in these cases.

From the above it follows that the vehicle incorporating the invention is arbitrarily movable in all possible directions and that all movements of the vehicle take place without scraping or sliding on the ground.

As shown in FIGS. 9 and 10, the sheaves or wheels 31 could be replaced by rollers 36 which could with advantage be made convex or bobbin shaped. Such rollers could be made to overlap one another more easily than sheaves and thus give a smoother motion with both reduced vibration and a lower point loading on the ground. Of course, as an alternative, screw thread shaped elements of the kind shown in FIGS. 5 and 6, or a similar design with a pitch angle corresponding to the obliquity of the sheaves 31, could be employed.

The above forms of the arrangement invented could be modified in one or more respects within the framework of the concept of the invention. For example the vehicle could, if required, be fitted with more than four sets of driving gear and the driving gear could be fitted with individual motors of one kind or another, capable of independent regulation. In this connection the concept vehicle ought to be taken in the broadest interpretation and it should thus be regarded as also encompassing other types of transport vehicle.

What is claimed is:

1. A directionally stable self-propelled vehicle adapted for travel in any desired direction over land or other surfaces, said vehicle comprising, in combination:
   a. a first pair of axles secured to the forward portion of the vehicle and extending transversely outwardly with respect to the longitudinal axis of the vehicle,
   b. a second pair of axles secured to the rearward portion of the vehicle and extending transversely outwardly with respect to the longitudinal axis of the vehicle,
   c. a pair of driving means secured to the outer ends of both the first and second pair of axles wherein each driving means is independently rotatable by its associated axle and includes:
      1. a driving wheel, and
      2. a plurality of bobbin-shaped rollers secured to the periphery of the driving wheel at an angular disposition with respect to the axis of rotation of the wheel such that the rolling direction surface contact lines of the rollers of the front wheels intersect at a point rearward of said first pair of axles while the rolling direction surface contact lines of the rollers of the rear wheels intersect at a point forward of said second pair of axles.

2. The vehicle of claim 1 wherein both the front and rear rolling direction surface contact lines form an angle of from 30° to 60° with respect to the axis of rotation of the wheels.

3. The vehicle of claim 2 wherein the angle is 45°.

4. The vehicle of claim 1 further including first and second motors drivingly connected to the first and second pair of axles, respectively, for independently rotating each of the axles.

5. The vehicle of claim 1 wherein the rolling direction contact lines of the rollers are each parallel to the longitudinal axes of the rollers from which each line is determined.

* * * * *